United States Patent [19]

Pelet et al.

[11] Patent Number: 4,755,632
[45] Date of Patent: Jul. 5, 1988

[54] MECHANICAL FUSE FOR A CABLE CONNECTION TAIL OF A SUBMARINE REPEATER

[75] Inventors: André Pelet, Maurepas; Christian Cavé, St Maur Des Fosses, both of France

[73] Assignee: Alcatel Cit, Paris, France

[21] Appl. No.: 121,251

[22] Filed: Nov. 16, 1987

[30] Foreign Application Priority Data

Nov. 14, 1986 [FR] France ................................. 86 15874

[51] Int. Cl.$^4$ ..................... H02G 15/14; H02G 15/07; F16D 9/00; F16B 21/12
[52] U.S. Cl. ............................... 174/70 S; 350/96.20; 403/2; 464/33
[58] Field of Search ........................... 174/70 R, 70 S; 350/96.20; 403/2; 439/475; 464/33

[56] References Cited

U.S. PATENT DOCUMENTS

| 2,840,262 | 6/1958 | Learmonth et al. | 174/70 S X |
| 3,780,210 | 12/1973 | Rocton | 174/70 S |
| 4,721,355 | 1/1988 | Gould | 350/96.20 |

FOREIGN PATENT DOCUMENTS 1152458 8/1963 Fed. Rep. of Germany .
1364112 8/1974 United Kingdom .

Primary Examiner—Laramie E. Askin
Attorney, Agent, or Firm—Sughrue, Mion, Zinn, Macpeak, and Seas

[57] ABSTRACT

A mechanical fuse for a cable connection tail of a submarine repeater in a cable transmission link, said cable connection tail extending from a case for repeater equipment, having a "free" end for connection to the head of a line cable fixed to the repeater when the link is laid, and including a tube which encloses the transmission-providing elements. The mechanical fuse comprises a plug (40) threaded over and fixed to the end of the tube (30) at the free end of the cable connection tail, a ring (41) fitted over the plug (40) and free to escape from the plug (40) in a direction running away from the cable connection tail, and mechanically fixed to the cable head, and a set of pins (42) transversely connecting the ring (41) to the plug (40) and having a cumulative shear strength which is less than the breaking strength of the tube of the cable connection tail.

8 Claims, 2 Drawing Sheets

MECHANICAL FUSE FOR A CABLE CONNECTION TAIL OF A SUBMARINE REPEATER The present invention relates to submarine cable transmission links equipped with submerged repeaters, and more particularly to connecting said repeaters to the line cable.

BACKGROUND OF THE INVENTION

A submerged repeater housing is in the form of a cylindrical cask which is very strong in mechanical traction and which constitutes or contains a metal case for protecting the repeater equipment from the marine environment. This cask as assembled and tested in the factory is equipped at each end with fixing means for a line cable connection device which transmits the traction forces exerted on the line cable and with a cable connection tail connected to the repeater equipment through the wall of the case via a sealed feedthrough and which is connected to the line cable when the link is being laid. The cable connection tail does not have to withstand the traction forces which are taken up by the fixing means, and has a sealed structure solely for the purpose of withstanding the ambient pressure. The tail is constituted by a conductive tube which is used for remote power feed and which is coated on the outside with a polyethylene sheath and which houses items that provide transmission, for example optical fibers.

The means for fixing the connection devices with which a repeater cask is equipped constitute a weak point where the chain formed by the repeaters and the line cable may break due to an exceptional traction force being exerted accidentally on the line cable. Unfortunately, a break in the link at this location between the repeater cask and the line cable connection device is particularly damaging since it gives rise to uncontrolled breakage of the cable connection tail which may give rise to ingress of water into the repeater case.

Preferred embodiments of the present invention avoid the above risk of water ingress by providing a breakage point at the head of the cable connection tail, i.e., at its end furthest from the equipment casing of the repeater.

SUMMARY OF THE INVENTION

The present invention provides a mechanical fuse for a cable connection tail of a submarine repeater in a cable transmission link, said cable connection tail extending from a case for repeater equipment, having a "free" end for connection to the head of a line cable fixed to the repeater when the link is laid, and including a tube which encloses the transmission-providing elements, the mechanical fuse comprising: a plug threaded over and fixed to the end of the tube at the free end of the cable connection tail; a ring fitted over the plug and free to escape from the plug in a direction running away from the cable connection tail, the ring being mechanically fixed to the cable head; and a set of pins transversely connecting the ring to the plug and having shear strength which is less than the breaking strength of the tube of the cable connection tail.

In a preferred embodiment, the mechanical fuse is received in the wall of a very rigid sealed connection box which is mechanically connected to the cable head, with the ring being held captive in a cage made in its passage through the wall and closed by a nut having an outside thread.

BRIEF DESCRIPTION OF THE DRAWINGS

An embodiment of the invention is described by way of example with reference to the accompanying drawings, in which.

MORE DETAILED DESCRIPTION

Figure 1:
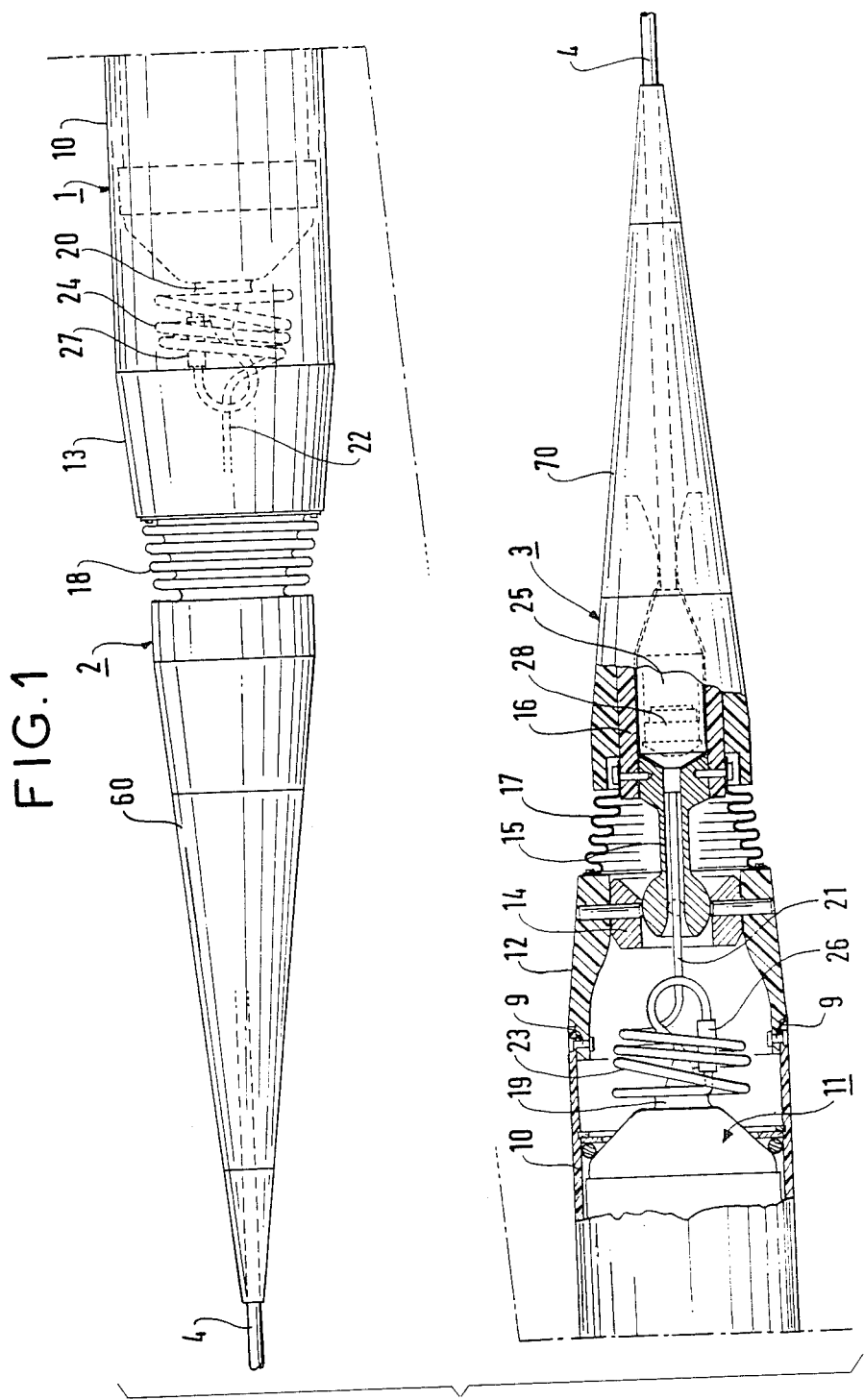
FIG. 1 is an elevation view in partial section of a submarine repeater shown in two halves for reasons of convenience.

As can be seen in FIG. 1, a submarine repeater for a cable transmission link using optical fibers is generally in the form of a cylindrical cask 1 which is extended at each of its ends by connection devices 2 and 3 for connection with the line cable 4, the outside shape of said devices being generally conical.

In the version shown, the cylindrical cask 1 comprises an outer shell 10 of fiber-resin composite material, e.g., glass fiber and epoxy resin composite covering a very rigid metal case 11 which is sheathed in polyethylene and which encloses the repeater equipment.

The outer shell 10 is very strong in traction and provides the mechanical connection between the connection devices 2 and 3. For this purpose, it is fitted at each end with fixing means constituted by screws 9 for fixing a sleeve 12 or 13 of the connection device 2 or 3 to the end, as can be seen for the sleeve 12. Each sleeve is connected via a joint system 14 contained therein to an axial oscillating arm 15 which screws to an anchor element 16 inside the corresponding connection device and fixed to the head of the line cable. The oscillating arm 15 is housed in a bellows 17 or 18 which connects to the outside surfaces of one of the sleeves 12 or 13 and of a conical envelope 60 or 70 belonging to the connection device 2 or 3 and surrounding the corresponding anchor element 16.

The sealed and very rigid metal case 11 isolates the repeater equipment from seawater. It is provided at each end with a sealed feedthrough 19 or 20 enabling a cable connection tail 21 or 22 to connect its internal equipment to line cable heads which terminate in the connection devices.

The cable connection tails 21 and 22 do not withstand the traction forces exerted by the line cable and are each formed by a conductive tube sheathed in polyethylene and serving to convey remote power supply current and enclosing optical fibers which lie loosely therein. Each tail is corkscrew shaped at 23 or 24 on leaving the corresponding sealed feedthrough 19 or 20 of the case 11 in order to provide a degree of flexibility for the joint system 14, and is then threaded along the oscillating arm 15 which is hollow in order to reach a splice box 25 which is sealed, very rigid, sheathed in polyethylene, and contained inside the connection device 2 or 3 inside the corresponding anchor element 16 for anchoring to a line cable head. Each sealed feedthrough 19 or 20 provides sealing outside the tube of the cable connection tail 21 or 22. The inside of the tube is sealed by means of a longitudinal sealing device 26 or 27 which is interposed over each cable connection tail 21 or 22 on leaving the case 11 and inside which the tube is interrupted to give place to a metal chamber filled with a plug of resin through which the optical fibers pass.

The means for fixing the shell 10 of the repeater cask to the sleeves 12 and 13, and more precisely the connection screws 9, constitute mechanically weak points where the chain constituted by the line cable and the repeaters may break if subjected to an abnormal traction force, which force is then applied to the cable connection tail 21 or 22 which is not designed to withstand it. In order to prevent the cable connection tail 21 or 22 from breaking between the case 11 and the longitudinal sealing device 26 or 27, thereby allowing ingress of seawater into the case 11 via the inside of the tube in the tail, a mechanical fuse is placed at the end of the cable connection tail 21 and 22 where it passes through the wall 28 of the splice box 25.

Figure 2:
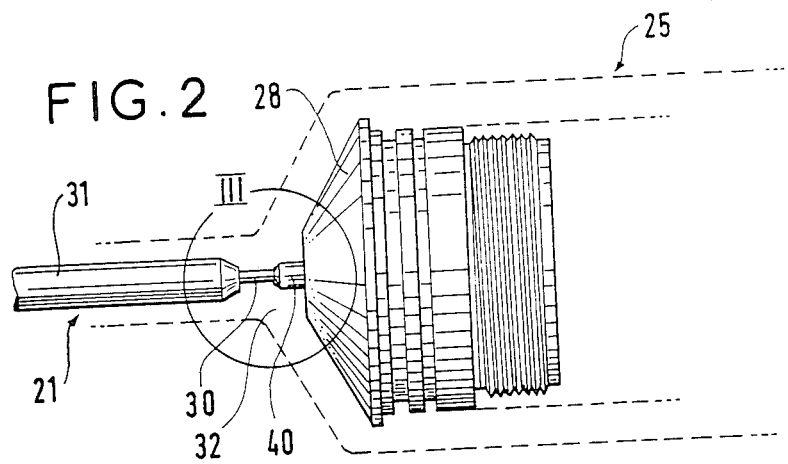
FIG. 2 shows details of the location of the mechanical fuse in accordance with the invention in the submarine repeater shown in the preceding figure.

The location of the mechanical fuse appears more clearly in FIG. 2 which shows the inlet of the cable tail 21 into the splice box 25. The conductive tube 30 of the cable tail is stripped of its polyethylene sheath 31, and is inserted into the wall 28 of the splice box 25 via a plug 40 which constitutes a portion of the mechanical fuse, said assembly being coated, together with the splice box, in a layer of polyethylene 32 which provides sealing.

Figure 3:
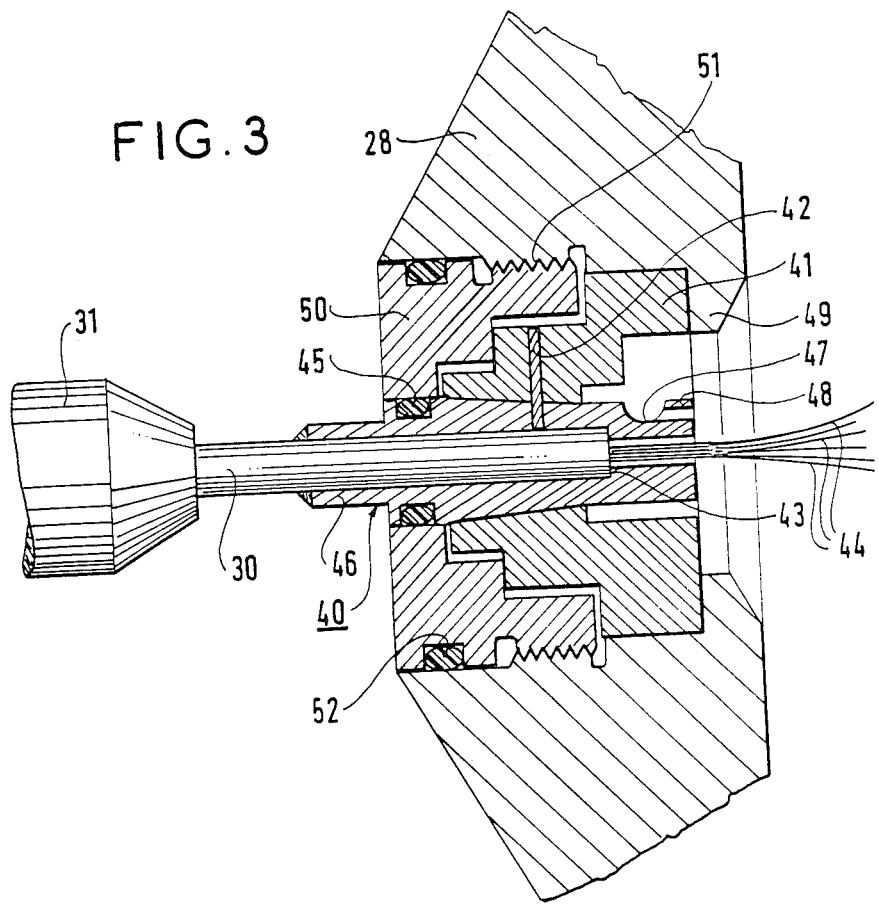
FIG. 3 shows a mechanical fuse in accordance with the invention in longitudinal section taken at the region III of FIG 2.

The mechanical fuse is shown in detail in FIG. 3 which is a fragmentary section of the region III of FIG. 2. It comprises three main elements: a tapering plug 40 which is fixed on the end of the tube 30 of the tail; a ring 41 into which the plug 40 fits, said ring being mechanically fixed to the wall 28 of the splice box; and a set of pins such as 42 which connect the ring 41 to the plug 40 transversely relative to the axis of the cable connection tail and having shear strength which is less than the tube breaking strength.

The plug 40 is made of metal. Its bore has the same diameter as the tube 30 of the tail and has an internal shoulder 43 constituting an abutment beyond which only the optical fibers 44 lying inside the tube 30 can pass, thereby limiting the extent to which the tube 30 can be inserted into the plug. The outer profile of the plug has a frustoconical central portion which engages the ring 41 and whose smaller diameter base is turned towards the inside of the splice box so as to put up no resistance to the ring 41 being pulled away under the effect of a traction force exerted on the cable connection cable via the splice box. This frustoconical central portion is preceded adjacent to its larger diameter base by a cylindrical portion at the maximum diameter of the plug 40 and including a groove which receives a sealing ring 45, and terminated by a skirt 46 for connecting the plug 40 to the outside of the tube 30 by welding, as shown, or else by swaging. At the smaller diameter base end, the central frustoconical portion of the plug 40 is followed by a cylindrical portion at said smaller diameter base end including a flat 47 delimiting a tab having a hole 48 at its end for connecting the plug 40 to an electrical conductor conveying remote power supply current to the inside of the splice box.

The ring 41 has a frustoconical bore which is complementary in shape to the central portion of the plug 40 onto which it fits. Its outer profile is cylindrical and has three steps with the smallest diameter portion of this stepped profile being adjaceent to the larger diameter end of its conical bore. It is threaded over the plug 40 after the plug has been threaded over and fixed to the tube 30 of the cable connection tail, it is fixed to the plug 40 by a set of three pins such as 42 passing through radial wells extending transversely from its periphery and located at 120° intervals from one another, said wells opening out into the middle step. Once fixed in this way to the tube 30 of the cable connection tail via the plug 40 and the pins 42, the ring 41 is inserted from the outside of the splice box into a cage provided in its wall 28. It comes into abutment against the bottom of the cage at a circular rim 49 delimiting the opening of the passage through the wall 28 to the inside of the splice box, and it is held in this cage by a closure nut 50 having an outside thread 51 and sliding freely over the plug 40 at its annular sealing ring 45.

The end of the nut 50 facing ring 41 has a cylindrical cavity with a stepped profile in which the ring 41 partially engages, and its outer periphery projecting beyond its screw thread 51 and furthest from the ring 41 has a cylindrical portion with a groove in which an annular sealing ring 52 is received which, together with the sealing ring 45, serves to seal the cage from the outer polyethylene coating of the splice box.

Traction forces exerted between the cable connection tail and the splice box give rise to shear forces in the pins 42 since the plug 40 is fixed indirectly to the wall 28 of the splice box via said pins, the ring 41, and the nut 50. Since the shear strength of the set of pins 42 is less than the breaking strength of the cable connection tail tube, the set of pins breaks first, thereby causing the plug 40 to be ejected from the wall of the splice box and breaking the fibers and the electrical conductor conveying remote power supply current, with the fibers breaking upstream from the longitudinal sealing device of the cable, i.e., on the far side thereof relative to the case 11 since the longitudinal sealing device also protects the fibers mechanically downstream from its plug of resin by transmitting the traction force exerted on the fibers upstream from the plug via said plug and via its metal chamber to the tube of the cable connection tail downstream therefrom. Thus, in the event of the means connecting the repeater cask to one of its connection devices breaking, the mechanical fuse breaks before the cable connection tail and the cable connection tail therefore remains fixed to the case with its equipment and avoids allowing water to penetrate therein.

We claim:

1. A mechanical fuse for a cable connection tail of a submarine repeater in a cable transmission link, said cable connection tail extending from a case for housing repeater equipment, said cable connection tail having a "free" end for connection to the head of a line cable fixed to the repeater when the link is laid, and including a tube which encloses the transmission-providing elements, the mechanical fuse comprising: a plug threaded over and fixed to the end of the tube at the free end of the cable connection tail; a ring fitted over the plug and free to escape from the plug in a direction running away from the cable connection tail, the ring being mechanically fixed to the cable head; and a set of pins transversely connecting the ring to the plug and having a cumulative shear strength which is less than the breaking strength of the tube of the cable connection tail.

2. A mechanical fuse according to claim 1, wherein said plug has a frustoconical outer profile and is threaded via a larger diameter base over the tube of the cable connection tail, and wherein said ring has a frustoconical bore which is complementary in shape and size to the frustoconical outer profile of the plug and against which it is engaged.

3. A mechanical fuse according to claim 1, wherein a splice box is mechanically fixed to the cable head and said ring is held captive in a cage in the passage through a wall of said splice box.

4. A mechanical fuse according to claim 3, wherein said cage is closed from the outside of the splice box by means of a nut having an outer three and being freely mounted over the plug.

5. A mechanical fuse according to claim 4, further including two annular sealing rings, one of said annular sealing rings being placed between the plug and the nut, and the other of said annular sealing rings being placed between the nut and the side wall of the cage.

6. A mechanical fuse according to claim 1, wherein said set of pins comprises three pins received, respectively, in wells passing transversely through the ring and the plug at 120° intervals, circumferentially spaced from one another.

7. A mechanical fuse according to claim 1, wherein the plug has a bore sized to the of diameter of the tube of the cable connection tail and said plug being provided with an inside shoulder constituting an abutment limiting the depth to which the cable connection tail tube can be inserted therein.

8. A mechanical fuse according to claim 1, for a cable connection tail having a metal tube, and wherein the plug is made of metal, is fixed to the metal tube of the cable connection tail in such a manner as to provide electrical continuity therewith, and is provided with a tab having a hole for connection to an electrical conductor.

* * * * *